UNITED STATES PATENT OFFICE.

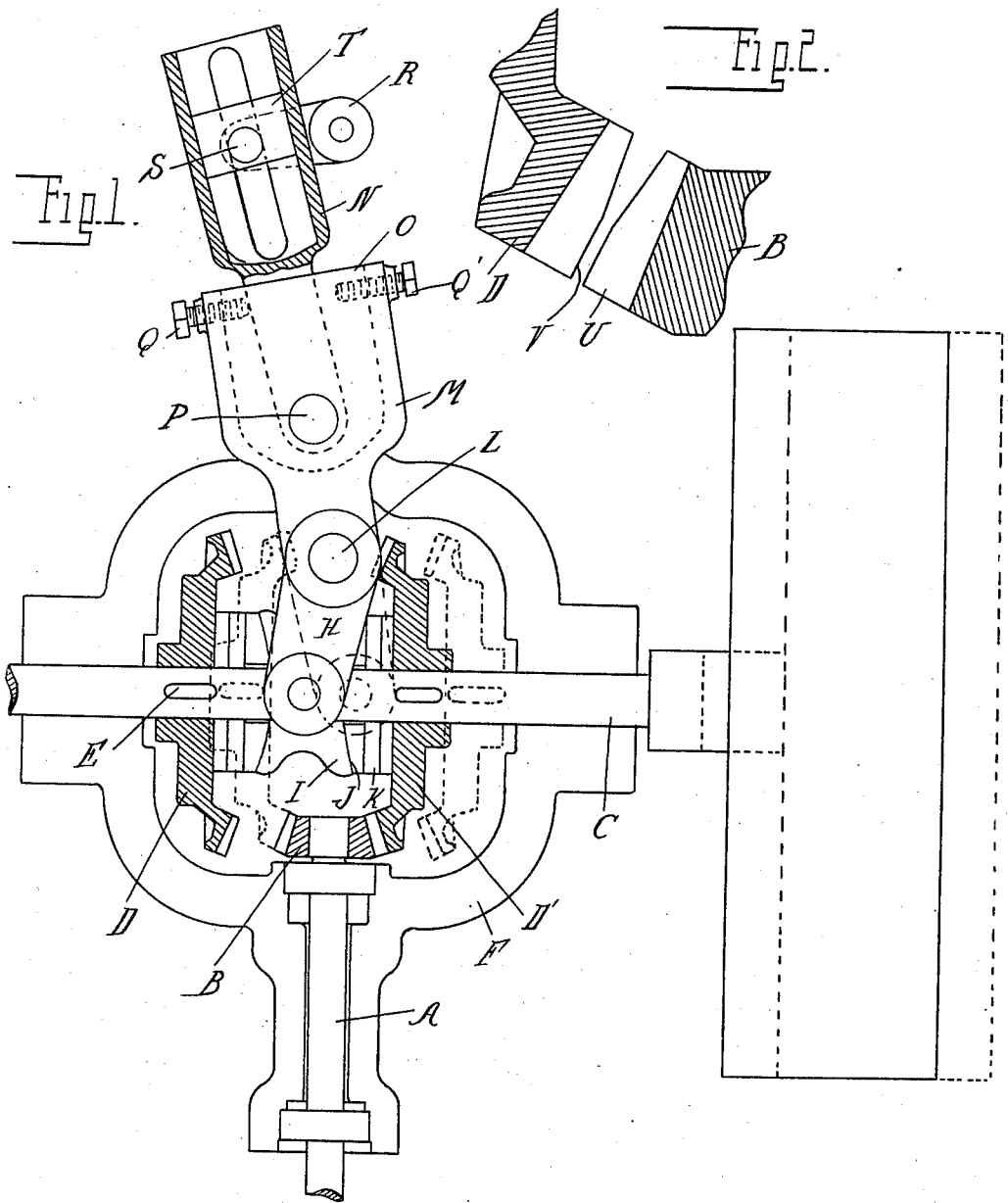

NORMAN T. HARRINGTON, OF LANSING, MICHIGAN.

REVERSING TRANSMISSION MECHANISM.

1,037,002.　　　　Specification of Letters Patent.　　Patented Aug. 27, 1912.

Application filed July 15, 1911.　Serial No. 638,739.

*To all whom it may concern:*

Be it known that I, NORMAN T. HARRINGTON, a citizen of the United States of America, residing at Lansing, in the county of Ingham and State of Michigan, have invented certain new and useful Improvements in Reversing Transmission Mechanism, of which the following is a specification, reference being had therein to the accompanying drawings.

The invention relates to transmission mechanism and is more particularly designed for use in connection with traction engines having for its object the avoidance of a divided shaft construction, and also the obtaining of a simple, compact and durable form of reversing transmission mechanism.

In the drawings,—Figure 1 is a longitudinal section through the transmission mechanism showing the controlling rock arm in sectional elevation; and Fig. 2 is a detail sectional view.

In the present state of the art various constructions of reversible transmission mechanism have been made in which opposed bevel gear wheels are arranged upon opposite sides of a pinion and are adapted to be alternatively engaged therewith.

The present invention relates to mechanism of this type but the construction is such that greater strength and durability of parts are obtained.

In detail, A is the driving shaft upon which is mounted the bevel pinion B.

C is a shaft perpendicular to the shaft A and extending across the end thereof.

D and D' are bevel gear wheels mounted upon the shaft C upon opposite sides of the pinion B and having their toothed faces opposed. The gear wheels D and D' are rigidly mounted upon the shaft and keyed thereto as indicated at E, and as the shaft C extends unbrokenly to its supporting journals, a very rigid and strong construction is obtained.

F is a yoke frame having formed therein, bearings for the shafts A and C and embracing the gear wheels D and D'.

H is a rocker arm mounted in the yoke frame F between the gear wheels D and D' and preferably bifurcated to embrace a block member I sleeved about the shaft. This block member is preferably concaved at its opposite ends to engage convex bearings J on a thrust bearing K extending to the adjacent gear wheel D. The arrangement is such that when the rocker H is shifted it will move the block I longitudinally of the shaft C and through the thrust bearings K will transmit its motion to the gear wheels D, D' and shaft C, which are moved bodily, thereby alternatively engaging the gears D and D' with the pinion B.

To operate the rocker H a suitable operating connection is provided but it is essential that the movement should be confined within exact limits as otherwise the gears will be jammed against the pinion and imperfectly engaged therewith, which would be objectionable. I have obtained this exact movement by an operating connection preferably constructed as follows: L is a rock shaft upon which the rocker H is mounted and M is a rock arm or lever for actuating the shaft L. N is an extension of the rock arm M which engages a socket O in the end portion thereof and is pivotally secured thereto at P. Q and Q' are setscrews in the socket O upon opposite sides of the pivot extension N and adapted to be adjusted for variably limiting the independent movement of said extension. R is an operating device for rocking the extension N which, as shown, comprises a crank having the pin S thereof engaging a slidable bearing T in a socket at the end of the extension member N.

With the construction as described, the rotation of the crank R will impart a rocking movement to the lever M and extension N thereof. This movement is transmitted through the shaft L to the rocker H and from the latter to the thrust bearing, bevel gears and shaft. The amount of throw of the crank R is such as to move the gear wheels D and D' a greater distance than necessary to engage the same alternatively with the pinion B. However, this excess of movement is avoided by providing lost motion between the rockable lever M and the extension N thereof and this is accomplished by an adjustment of the said screws Q and Q'. Thus the greater the space between the extension N and the set-screws the greater the amount of lost motion which correspondingly diminishes the amount of movement transmitted to the member M. It will be understood that by proper adjustment of the set-screws Q and Q' the movement imparted to the gear wheels D and D' can be so limited that each gear wheel will come into full mesh with the pinion B but will avoid binding thereagainst.

As usually constructed, bevel gear wheels when in mesh with each other are so constructed that lines projecting from the inner and outer faces of the teeth will coincide with the point of intersection of the axes of said gears. Thus said inner and outer faces are in angular relation to each other and consequently the outer faces of the two gears are in angular relation. It is evident therefore that if the gears are engaged and disengaged all portions of the teeth will not simultaneously enter into engagement, but said engagement will start from single points in the gear teeth. The effect of this is to increase the liability of breaking of the teeth when they are moved into engagement. In my construction I have avoided this by changing the angle of a portion of the outer faces of the teeth so as to be the same in both of the intermeshing gears, and therefore, to permit of simultaneous engagement and disengagement of all portions thereof. As shown each tooth U has a portion V of its outer face cut-off to an angle parallel to its inner face which will produce the desired result.

With the construction as described in operation the mechanism may at any time be reversed by manipulation of the crank R which will shift the rocker arms N and M which in turn operate the rocker H and shift the gear wheels B and B'. During this movement the teeth U of the gear wheels will be brought into mesh with the corresponding teeth of the pinion B, but on account of the angle of the portions V the teeth will be engaged without danger of breakage.

What I claim as my invention is:

1. In a transmission mechanism the combination with a rotatable bevel pinion, of opposed bevel gear wheels upon opposite sides of said pinion, a longitudinally adjustable shaft upon which said wheels are fixedly mounted, means for adjusting the shaft to alternately engage the pinion with said wheels, and adjustable means for limiting the movement of said first-mentioned means to effect a predetermined engagement of the pinion with said wheels.

2. In a transmission mechanism, the combination with a rotatable bevel pinion, of a pair of opposed bevel gear wheels arranged upon opposite sides of said bevel pinion, a shaft upon which said bevel gear wheels are rigidly mounted, a member between said bevel gear wheels having a thrust bearing engagement therewith, a rockable member for engaging said member intermediate the gear wheels, and adjustable means for exactly determining the movement imparted to said rocker.

3. In a transmission mechanism, the combination with a rotatable bevel pinion, of a pair of opposed bevel gear wheels arranged upon opposite sides of said bevel pinion, a shaft upon which said bevel gear wheels are rigidly mounted, journal bearings for said shaft permitting the longitudinal adjustment thereof, a member between said bevel gear wheels having end thrust bearing engagement therewith, a rocker engaging said member, means for operating said rocker, and adjustable means for exactly determining the movement of said rocker to produce the proper engagement of said bevel.

4. In a transmission mechanism, the combination with a rotatable bevel pinion, of opposed bevel gear wheels arranged upon opposite sides thereof, a shaft upon which said bevel gear wheels are fixedly mounted, bearings for said shaft permitting the longitudinal adjustment thereof, a member sleeved about said shaft intermediate said gear wheels, thrust bearings between said sleeve and gear wheels, a rockable member having a portion embracing said sleeve, and means for actuating said rockable member between exact limits of movement, said limits being adjustable to effect a full engagement of said bevel gear wheels with said pinion.

5. In a transmission mechanism, the combination with a rotatable bevel pinion, of opposed bevel gear wheels arranged upon opposite sides of said pinion, a shaft upon which said bevel gear wheels are fixedly mounted, a rockable member for shifting said shaft and gear wheels to alternately engage the latter with said pinion, a member for actuating said rockable member adapted to impart to the latter a movement in excess of that needed for the shifting of said gear wheels, and means for variably introducing lost motion in the operating member to limit the actuation of said rockable member.

6. In a transmission mechanism, the combination with a rotatable bevel pinion, of opposed bevel gear wheels arranged upon opposite sides of said pinion, a shaft upon which said gear wheels are fixedly mounted, a rockable member for adjusting said shaft and gear wheels to alternately engage the latter with said pinion, a rockable actuating arm for said rockable member, an extension of said actuating arm, means for actuating said extension to impart to said actuating arm a greater movement than necessary for the adjustment of said bevel gear wheels, and an adjustable connection between said extension and actuating member for introducing a variable degree of lost motion therebetween.

7. In a transmission mechanism, the combination with a rotatable bevel pinion, of a bevel gear wheel arranged upon one side of said pinion and adjustable into and out of mesh therewith, said pinion and gear wheel being provided with teeth having portions of their outer faces parallel, whereby all points in said parallel portions will simultaneously enter and leave engagement with the teeth of the opposite member.

In testimony whereof I affix my signature in presence of two witnesses.

NORMAN T. HARRINGTON.

Witnesses:
 GEORGE F. KNOWLES,
 L. E. CHAPMAN.

Copies of this patent may be obtained for five cents each, by addressing the "Commissioner of Patents, Washington, D. C."